UNITED STATES PATENT OFFICE.

THOMAS A. HILLIARD, OF SIOUX CITY, IOWA.

FERTILIZER.

1,128,446. Specification of Letters Patent. Patented Feb. 16, 1915.

No Drawing. Application filed December 12, 1912. Serial No. 736,251.

*To all whom it may concern:*

Be it known that I, THOMAS A. HILLIARD, a citizen of the United States, residing at Sioux City, in the county of Woodbury and State of Iowa, have invented certain new and useful Improvements in Fertilizers; and I do hereby declare the following to be a full, clear, and exact description of the invention, such as will enable others skilled in the art to which it appertains to make and use the same.

This invention relates to fertilizers, and it more particularly relates to the combination of certain fertilizing elements with a suitable base or vehicle.

An object of the invention is to incorporate certain fertilizing elements in such a vehicle that the said elements will be deposited gradually and regularly into the soil.

Another object of the invention is to provide a fertilizer which will lighten the soil.

Another object of the invention is to provide a fertilizer of this character, the base or vehicle of which is subjected to gradual decomposition, and in which the composite elements are of a soil enriching nature.

In carrying this invention into effect, I preferably employ saw dust or the like as the base or vehicle; although, obviously, I may employ more or less finely divided wood, bark or woody material of a suitable kind. It is also obvious that, instead of relying entirely on the residue of saw mills, from which saw dust may be obtained, I may prepare or divide any suitable kind of wood into any suitable granules or divisions, and by any suitable means.

The kinds and percentages of fertilizer elements employed will depend upon the nature of the land to be treated by the fertilizer; but, let it be assumed that the fertilizer is to contain the ordinary percentages of ammonia, potash, phosphorus, etc.; these chemicals are preferably mixed or combined in solution in large vats or receivers, and the finely divided granules of wood are preferably denuded of the greater percentage of their moisture, and are then thoroughly incorporated by stirring or otherwise submerging until the pores thereof have become thoroughly saturated with the liquid mixture. And while still wet with the fertilizing chemicals, these wood granules may be mixed with a suitable proportion of bone dust, lime, plaster, guano, or other powdered fertilizing material, so that the mass is thereby reduced to a comparatively dry state, whereupon it may be put into bags for transportation.

The advantages of a fertilizer compound of this character are as follows: First, the saw dust or woody granular vehicle is an improved substitute for sand and other earthy materials, such as have heretofore been employed as a vehicle; because such earthy materials have little, if any, fertilizing value, while woody material is known to possess fertilizing qualities; second, this woody base or vehicle is comparatively light, as compared with the weight of earthy materials, and therefore the saving of freight is a very considerable item; third, the woody granules do not immediately decompose, but remain intact, so as to retain the fertilizing chemicals within their pores, and gradually impart these chemicals to the soil; in explaining this latter advantage to those who are familiar with the art, attention is directed to the fact, that if the full force of the fertilizer is exerted in the incipiency of the plant, said plant or crops grow abnormally while the fertilizer is acting in full force, but as soon as the force and effect of the fertilizer is spent, the plant becomes stunted or dwarfed, for the reason that it has depended upon the fertilizer to the exclusion of the natural elements of the soil and atmosphere.

With my improved fertilizer, the plant receives more of the fertilizing chemicals in its incipiency than at a later period, owing to the fact that the surface and the contiguous portion of each granule contains more of said fertilizing chemicals, than is contained in the heart of the granule, and for the reason that the surface is more accessible to the plant than is the heart; however, since the granules are not immediately decomposed or disintegrated, a constantly decreasing percentage of the fertilizing chemicals will be continually given out to the soil, while a constantly decreasing percentage thereof will remain in the granules until they have finally become disintegrated.

From the foregoing, it will be seen that I have provided an improved fertilizer, which is thoroughly practical and efficient, and which is economical of manufacture and transportation, thereby constituting an improvement in the art.

I claim:

A fertilizer consisting of a dry mixture of bonedust, guano and sawdust carrying ammonia, potassium, and phosphorous compounds partly absorbed therein.

In testimony whereof I have signed my name to this specification in the presence of two subscribing witnesses.

THOMAS A. HILLIARD.

Witnesses:
FLORENCE WARNER,
JOHN BUCKIS.